United States Patent
Labordus et al.

(10) Patent No.: US 6,875,501 B2
(45) Date of Patent: Apr. 5, 2005

(54) METHOD FOR THE PRODUCTION OF A LAMINATE AND BENT PRODUCT CONSISTING OF LAMINATE

(75) Inventors: Maarten Labordus, Delft (NL); Michael Johannes Leonardus Van Tooren, Delft (NL)

(73) Assignee: Stork Fokker AESP B.V., Papendrecht (NL)

(*) Notice: Subject to any disclaimer, the term of this patent is extended or adjusted under 35 U.S.C. 154(b) by 0 days.

(21) Appl. No.: 10/321,583

(22) Filed: Dec. 18, 2002

(65) Prior Publication Data

US 2004/0053027 A1 Mar. 18, 2004

(30) Foreign Application Priority Data

Dec. 18, 2001 (NL) .............................................. 1019601

(51) Int. Cl.[7] ................................................. B32B 7/00
(52) U.S. Cl. ....................... 428/213; 428/457; 427/229; 427/304
(58) Field of Search ................................ 428/213, 457, 428/378; 427/229, 304, 350

(56) References Cited

U.S. PATENT DOCUMENTS

| 3,697,319 A | * | 10/1972 | Feldstein | ..................... 427/98 |
| 4,110,147 A | * | 8/1978 | Grunwald et al. | ....... 156/307.5 |
| 5,039,571 A | * | 8/1991 | Vogelesang et al. | ........ 428/213 |

FOREIGN PATENT DOCUMENTS

| EP | 0 743 174 | 11/1996 |
| EP | 1 103 370 | 5/2001 |

* cited by examiner

*Primary Examiner*—Merrick Dixon
(74) *Attorney, Agent, or Firm*—Young & Thompson

(57) ABSTRACT

Method for the production of a laminate and bent product produced from such a laminate. The laminate is made up of at least two outer sheets of metal material with a layer of fibre-reinforced resin between them. During production the fibre layer is applied dry and the layer of resin material is applied around the fibre material only at a later stage. This can take place either by injection or by rendering fluid a layer of resin material that is applied adjoining the layer of fibre material in the laminate. In this way it is ensured that complete filling of the adjacent sheets of metal material with fibre-reinforced resin takes place even in bends.

12 Claims, 2 Drawing Sheets

METHOD FOR THE PRODUCTION OF A LAMINATE AND BENT PRODUCT CONSISTING OF LAMINATE

The present invention relates to a method for the production of a laminate comprising at least two outer metal sheets and a fibre-reinforced resin located between them.

A method of this type is disclosed in U.S. Pat. No. 5,039,571.

Compared with an aluminium sheet of the same thickness, the strength characteristics of a laminate consisting of two outer sheets of aluminium material and fibre-reinforced resin located between them are not very different. However, this applies with the exception of the fatigue strength and damage under impact. If a crack is initiated in a solid metal layer this will propagate relatively rapidly with respect to the initiation time. This does not apply for a laminate as described above because in this case the load-bearing function will be at least partially taken over by the resin-reinforced fibre layer.

According to the prior art, a laminate as described above is produced by placing a so-called unidirectional prepreg material between the outer metal sheets. A prepreg is a pre-produced combination of a resin in the uncured viscous state and fibre material. An intended construction is then placed in a vacuum bag and this assembly is placed in an autoclave where an increased pressure of up to 6 bar is applied at elevated temperature. As a result of the vacuum the two sheets of metal material are drawn towards one another, which effect is further enhanced by the pressure applied in the autoclave. This complex action is necessary in order to be certain that the resin material is pressed out as far as possible, that is to say to ensure that the fibres are in fact the spacers between adjacent sheets of metal material. The vacuum acts both as a compressive force for this stacking and for driving force for the impregnation of the dry fibres with resin, optionally in combination with an increase in temperature.

One problem in the case of the use of a prepreg is the presence of air. Under all circumstances it must be ensured that any air inclusions are removed and compressed as far as possible and for this purpose additional pressure is applied by an autoclave.

It will be understood that a method of this type is complex. The product obtained generally complies with the requirements imposed.

However, problems arise if the laminate has to have an appreciable double bend. After all, in general it cannot be guaranteed that the distance between the adjacent sheets of metal material is constant at the location of such a bend. Because the fibres act as spacers, this means that perfect contact between fibres and adjoining sheets of metal material does not take place at specific locations in the bent section. Because use of the resin material in the prepreg is very closely associated with the fibre material, it is also not possible to guarantee that filling with resin takes place at such a location. In practice it has been found that (micro) porosity can be produced in such cavities, as a result of which the mechanical properties of such a laminate rapidly decrease. This occurs in particular if the laminate is bent in two mutually perpendicular directions.

Apart from the expensive treatment in an autoclave, restrictions are also consequently imposed with respect to the dimensions of the laminate. The use of large autoclaves is particularly expensive. A further disadvantage is that prepreg material has to be stored at low temperature because otherwise curing takes place. Moreover, it is necessary to work under very clean conditions, which approach clean room conditions, in order to prevent the ingress of dirt and moisture. Drawbacks for the person concerned are associated with working with the uncured resin in the prepreg.

The aim of the present invention is to avoid the disadvantages described above and to provide a method with which it is easily possible to produce laminates which, moreover, can be bent on all sides without the mechanical properties thereof decreasing.

According to a first aspect of the invention, this aim is achieved with a method for the production of a laminate comprising at least two outer metal sheets and a fibre-reinforced resin located between them, wherein one of said metal sheets is provided, fibre material is applied on top of this, followed by the application of the following metal sheet, after which vacuum is applied to the pre-product obtained in this way while impregnating the resin in said fibre, said applying of vacuum in the interior of the pre-product is realised under atmospheric conditions acting externally on the pre-product.

According to the present invention the fibre material is applied in the dry state, that is to say without it being mixed with resin material as is the case with a prepreg, between the sheets of metal material. Only then is the resin material impregnated into the fibre under vacuum conditions. If necessary, the temperature is increased to achieve curing of the resin.

It has been found that it is no longer necessary to use an autoclave because the resin material no longer has to be pressed out of the fibre material. It has been found that the provision of vacuum is sufficient to ensure contact between the fibres and the adjoining sheets of metal material. The fibres used can be any type of fibres known in the state of the art. This applies both in respect of the fibre material (glass, carbon) and in respect of the orientation. The latter can be arbitrary, balanced in two mutually different directions in the form of a woven fabric or unidirectional, although with a small fraction in the other direction to hold the fibres together while placing between the layers of metal material. In general, the latter will be used to hold the fibre material together when placing between the layers of metal material.

The introduction of the resin material can be carried out in any way known in the art.

According to an advantageous embodiment of the invention vacuum injection is preferably used. That is to say when drawing the sheets of metal material together under suction, with the fibre material between them, resin material such as epoxy or polyester is introduced from a point that preferably is remote from the vacuum suction point. The force generated by the vacuum is still sufficient to hold the layers of metal material together.

Working with vacuum injection technology has many advantages because the user no longer comes into contact with the resin. Moreover, there is no longer the problem of contamination as in the case of prepreg material when placing between the sheets of metal material. Very slight contamination when handling the dry fibres is not a problem. Any moisture in the fibre material is adequately removed by applying a high vacuum.

However, in the case of larger products it is necessary to provide a channel system in order to guarantee good distribution of the resin material through the fibres.

According to a further variant of the invention, such channel systems can be dispensed with in the case of larger products if the resin material is applied to the fibres as a separate layer. That is to say, when combining the laminate a resin layer in the more or less solid state is applied to one or both sides of the fibre layer. Under vacuum conditions, when the temperature is raised the resin material becomes more fluid and disseminates between the fibres. In this way relatively large surfaces can be provided with the resin material in a guaranteed manner.

Both with the technique described above and with vacuum injection it is possible under all circumstances to guarantee that the cavity between two sheets of metal material is completely filled with resin. As described above, this is, in particular, important when producing bent laminate. If the distance between two adjacent sheets of metal material in a bend is not constant, a larger cavity will be locally produced by the effect of the fibres and this will be filled with resin without any problem using the technique described above.

When applying vacuum it is not necessary to place the product in a vacuum bag or to use other aids, except at the edges of the laminate where a vacuum-tight join has to be guaranteed between the two outer metal lamellae and locally a vacuum connection and, if necessary, a resin supply must be provided.

Preferably, the fibre material extends a little beyond the sheets of metal material at the location where vacuum is applied, so that it is possible easily to make a connection by means of which it is guaranteed that all air present in the fibre material and between fibre layers and the metal layers can be removed by applying vacuum. This is in contrast to the prior art where a prepreg is used and air can remain occluded between the prepreg layers and the metal layers.

This is in contrast to the state of the art where a prepreg is used. With this technique a felt cloth that serves as "breather" is placed over the entire product.

Of course, the laminate can consist of a large number of sheets of metal material with fibre-reinforced resin arranged between every two sheets.

A bent laminate can be produced in various ways. According to a first variant it is possible first to combine the assembly making up the laminate in the dry state. That is to say, the two outer sheets of metal material with the dry fibre material between them, optionally bordered by one or more layers of resin material, are stacked on top of one another and the assembly is then deformed. Vacuum is then applied at elevated temperature in the manner described above so that the resin (after injection if necessary) is able to cure.

According to a further variant of the invention the sheets of metal material are deformed before combining with the dry fibre and the dry fibre material is applied only after deformation.

The curing temperature is selected depending on the resin material used, the desired mechanical properties and the desired curing time. A value of approximately 120° C. is mentioned as an example.

The invention also relates to a bent product comprising a laminate consisting of at least two sheets of metal material located some distance apart, between which a layer of fibre-reinforced resin has been arranged, wherein the space for said fibre-reinforced resin in a bend in said product has unintentionally larger dimensions than at a non-bent location in the product and the resin/fibre ratio in said bend is greater than at a non-bent location in said product.

By means of the invention it is possible to adjust the mechanical properties in situ by means of the composition of the layer of fibres. That is to say, the properties of the laminate obtained can be easily influenced by arranging various layers of unidirectional fibres in a specific position with respect to one another, either directly on top of one another or separated by a sheet of metal material. With the method described above it is possible to optimise the fibre/resin ratio and a value of 55% is mentioned as an example.

Because the layers of metal material are airtight, only sealing close to the edges is required. This is in contrast to other constructions in the state of the art where vacuum is used and a layer of film covers the product to prevent loss of vacuum.

The sheets of metal material described above can be any material known in the prior art, such as aluminium, titanium and the like.

The invention will be explained in more detail below with reference to illustrative embodiments shown in the drawing.

Figure 1:
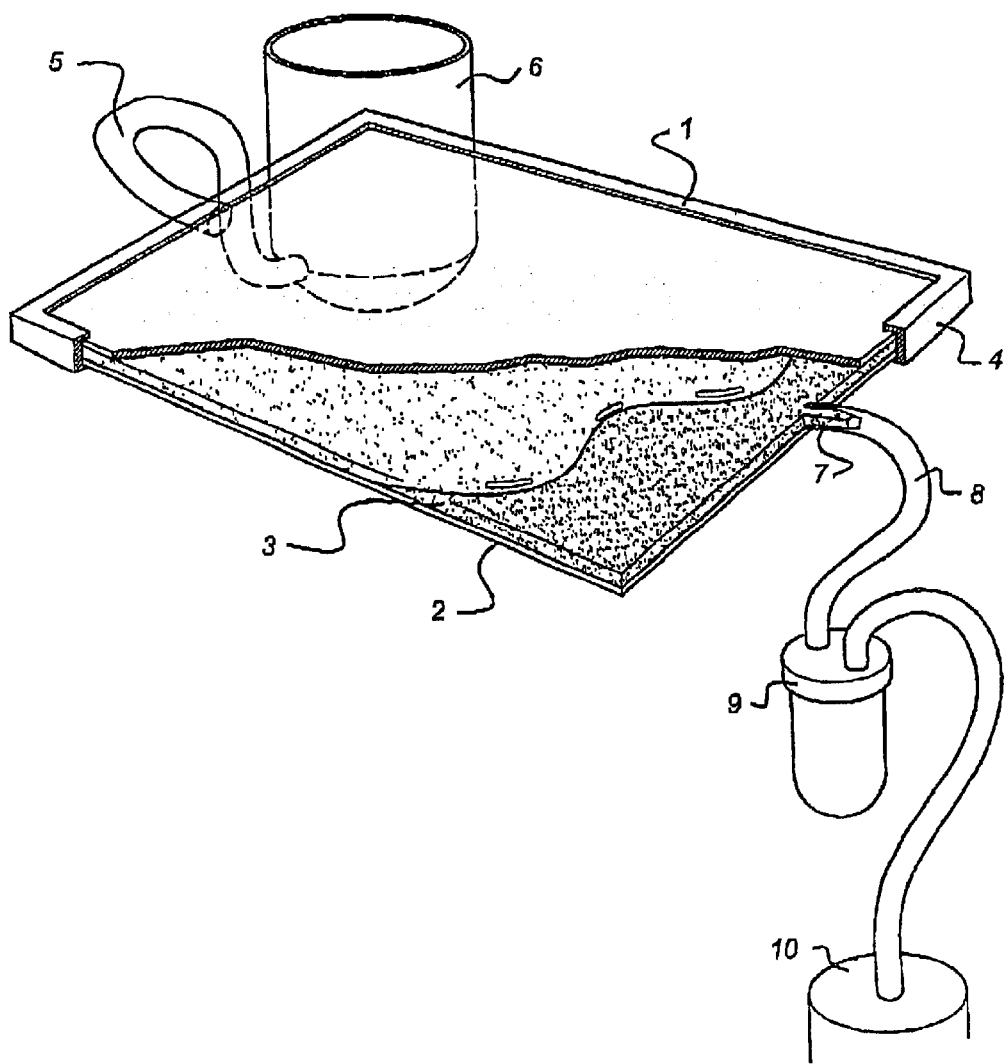
FIG. 1 shows, diagrammatically, the production of a laminate according to the invention.

In FIG. 1 two sheets of metallic material, such as sheets of aluminium material, are indicated by 1 and 2. According to the invention a layer of (dry) fibre material 3 is placed between these. This material can be any type of fibre material that is oriented in any desired direction. Before applying the dry fibre layer the layers of metallic material are subjected to an optional pretreatment, such as cleaning, etching or anodising, or provided with a primer. These treatments are known in the state of the art and are dependent on the metallic material used and the resin/fibre to be used.

After the layers of pretreated metal have been placed on top of one another with the layer of fibre material 3 inserted between them, a tape 4 is applied around the periphery to provide a peripheral seal. During this operation a gap is left on opposite sides. On the one side a gap is left for inserting hose 5 from a resin reservoir 6, whilst on the other side a protruding piece of fibre material 7 is connected to a hose 8 that leads to a trap 9 that is connected to a vacuum source 10.

According to the present invention vacuum is applied to the assembly comprising the two sheets of metallic material placed on top of one another with the dry fibre placed between them. Because the fibre is dry, air that is present will be sucked out rapidly and it is not necessary to take particular measures to prevent air inclusions. After all air has been sucked out, vacuum will be produced in hose 5, as a result of which resin is introduced. The resin front moves from left to right in FIG. 1 and any excess resin is collected in trap 9. The temperature is then raised. It is optionally possible already to work at elevated temperature when applying vacuum or introducing resin. In any event the various conditions are such that the resin cures and the laminate as shown in FIG. 1 is produced.

Figure 2:
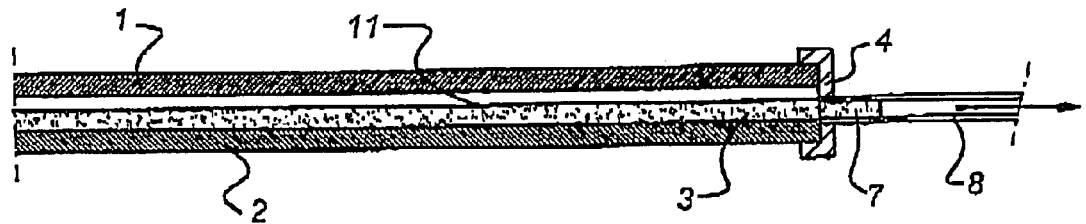
FIG. 2 shows an alternative of the method according to FIG. 1.

A variant of the method shown in FIG. 1 is shown in FIG. 2. With this method use is no longer made of the vacuum injection technique, but a layer of resin material 11 in the form of a resin film is applied between the sheets 1 and 2 and laid on the fibre material 3. In this variant as well the fibre material 3 is dry, as a result of which air can be removed in a simple manner. After combining, a tape 4 is applied around the periphery to provide a seal, as in the variant described above. A film bag can optionally be used. Vacuum is applied to the protruding part 7 via hose 8 and at the same time the temperature is raised so that the layer of resin material becomes less viscous and is able to penetrate into the fibre material. Here again excess material is trapped. Layers of resin material can optionally be present on either side of the layer of fibre material.

Figure 3:
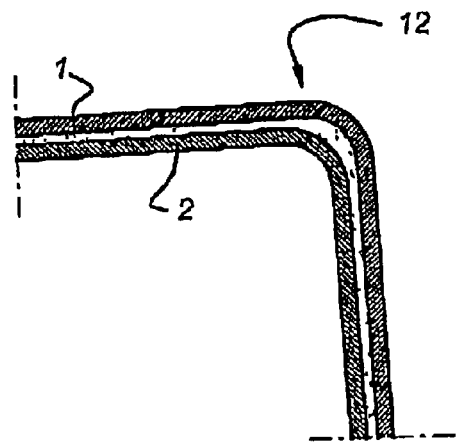
FIG. 3 shows a bent sheet according to the invention.

A bent product is shown in FIG. 3. This consists of the laminate according to the invention. The two sheets of metallic material are not a constant distance apart close to the bend 12. According to the invention the variation in distance is taken up by the resin material. After all, the fibre material no longer serves as a spacer in the bend. The air that was present in the radius has been completely removed previously and it will be possible for the space to be completely filled with resin. This is in contrast to the state of the art where a prepreg is used and the air that is present at such a location will remain occluded.

Figure 4:
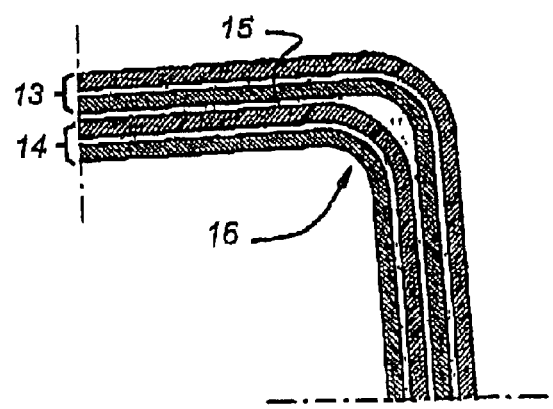
FIG. 4 shows an assembled laminate in the bent state according to the invention.

A further embodiment of the laminate according to the invention in the bent state is shown in FIG. 4. This laminate consists of two part laminates 13 and 14 which consist of essentially parallel sheets of metal material with fibre material placed between them. A further layer of fibre material 15 has been placed between these two part laminates 13 and 14, which further layer of fibre material 15 is provided with resin in the manner described above, either by injection or with the aid of a layer of resin material. In this case also there is a greater distance between the part laminates 13 and 14 in the bend that is indicated by 16, which greater distance is filled by the resin material. That is to say, according to the present invention cavities, which appreciably reduce the mechanical properties of the laminate obtained, are prevented from forming.

The resin used can be any resin known in the state of the art, such as a polyester or epoxy resin. Of course, a resin of low viscosity will be used for injection and any resin channels will be made in either the fibre material or the sheets of metallic material. If resin film is used, more viscous resins can be used because the distance over which the resin has to flow is very much shorter.

It will be understood that the above method is appreciably simpler to carry out than the method where an autoclave is used. After all, merely applying vacuum is sufficient to guarantee that all air is removed from the dry fibres. Moreover, products with complex bends can be produced by the method according to the present invention. These products can have any desired shape and size.

Although the invention has been described above with the aid of preferred embodiments, it will be understood that numerous modifications can be made thereto without going beyond the scope of the present application, which modifications are immediately obvious to those skilled in the art and fall within the scope of the appended claims.

What is claimed is:

1. A method for the production of a laminate comprising at least two outer metal sheets and a fibre-reinforced resin located between them, wherein one of said metal sheets is provided, fibre material is applied on top of this, followed by the application of the following metal sheet, after which vacuum is applied to the pre-product obtained in this way while impregnating the resin in said fibre and applying vacuum in the interior of the pre-product under atmospheric conditions acting externally on the pre-product.

2. The method as claimed in claim 1, wherein said vacuum is applied between said sheets and the peripheral edge between said sheets is sealed.

3. The method as claimed in claim 1, wherein some of said fibres extend beyond said sheets and said vacuum is applied thereto.

4. The method as claimed in claim 1, wherein a film of resin material is applied adjoining said fibre material, the viscosity of which film of resin material becomes so low at elevated temperature that the fibres are wetted by said material.

5. The method as claimed in claim 1, wherein resin is injected into the gap between the sheets while applying vacuum.

6. The method as claimed in claim 1, comprising the provision of at least two metal sheets bent in essentially the same way, which metal sheets are placed on top of one another with fibre material inserted between them.

7. The method as claimed in claim 1, wherein the assembly comprising the two metal sheets and the fibre material is subjected to plastic deformation before impregnating resin material and applying vacuum.

8. A bent product comprising a laminate consisting of at least two sheets of metal material located some distance apart, between which a layer of fibre-reinforced resin has been placed, wherein the space for said fibre-reinforced resin in a bend of said product has larger dimensions than at a non-bent location in the product and the resin/fibre ratio in said bend is greater than at a non-bent location in said product.

9. The bent product as claimed in claim 8, wherein said space is completely filled with fibre-reinforced resin.

10. The bent product as claimed in claim 8, wherein each sheet of metal material comprises a part laminate consisting of two sheets of metal some distance apart and a layer of fibre-reinforced resin between them.

11. The bent product as claimed in claim 8, wherein the product is bent in two mutually perpendicular directions.

12. A semi-finished product comprising at least two sheets of metal material with a layer of fibre material that contains no resin between them.

* * * * *